Nov. 29, 1949     O. G. RUTEMILLER     2,489,725
SPINDLE SPEED CONTROL
Filed May 10, 1947     2 Sheets-Sheet 1
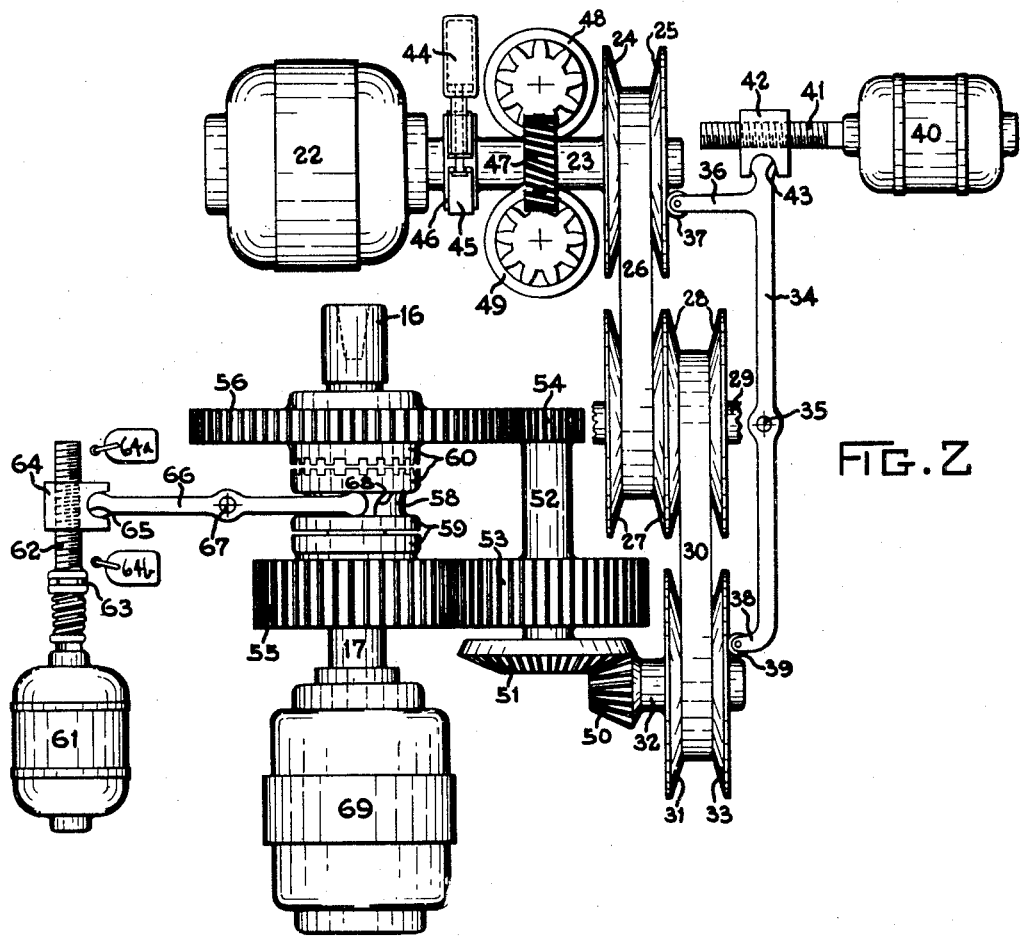
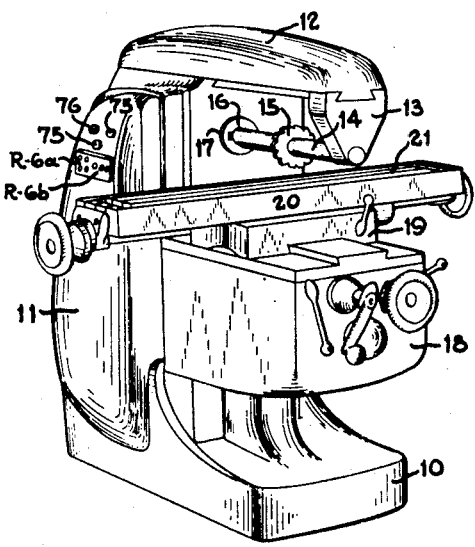
INVENTOR.
OREN G. RUTEMILLER
BY
Toulmin & Toulmin
ATTORNEYS

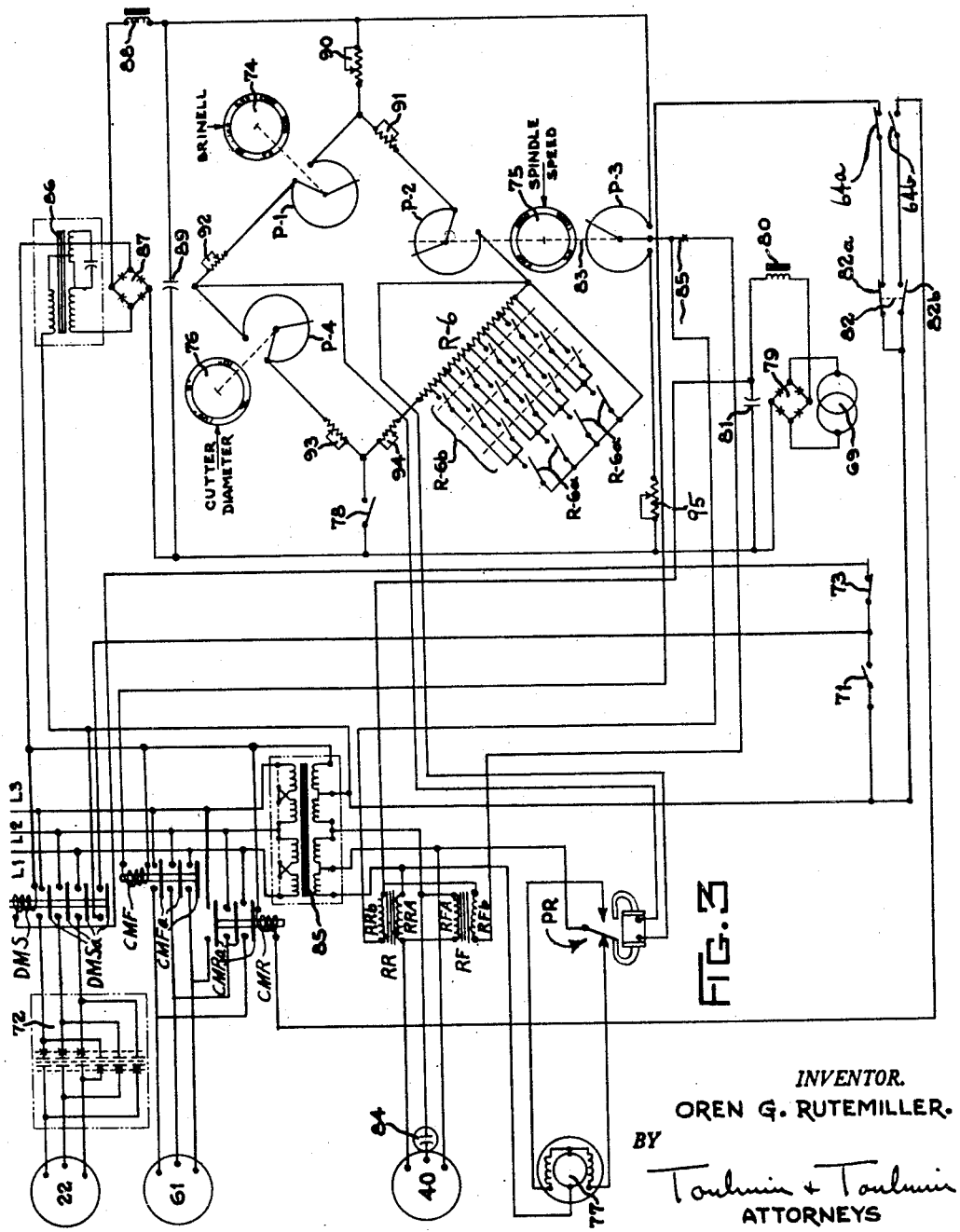

Patented Nov. 29, 1949

2,489,725

UNITED STATES PATENT OFFICE 2,489,725

SPINDLE SPEED CONTROL

Oren G. Rutemiller, St. Bernard, Ohio, assignor to The Cleveland Automatic Machine Company, Norwood, Ohio, a corporation of Ohio Application May 10, 1947, Serial No. 747,262

11 Claims. (Cl. 74—745)

This invention pertains to an automatic spindle speed control mechanism and is particularly directed to the controlling of the speed of a machine tool work or cutter spindle. More specifically, this invention is directed to the control of the speed of the cutter spindle of a milling machine.

One of the objects of this invention is to calculate the correct spindle speed for a given set of operating conditions and to control the operation of the spindle speed adjusting mechanism to establish the calculated spindle speed for any practical combination of operating conditions.

Another object of this invention is to provide an automatic spindle speed control mechanism which is conditioned by the operator who sets a series of control devices to condition the mechanism to the type of machining operation to be accomplished.

Another object of this invention is to provide an automatic spindle speed control mechanism which consists of a calculating mechanism into which absolute values of the operating parameters are set and which is driven by an automatic servo mechanism that solves the speed formula and develops a single voltage that is proportional to the calculated speed.

A further object of this invention is to provide in an automatic speed control mechanism, having the aforementioned automatic servo mechanism, a second servo mechanism that automatically adjusts spindle speed in response to the signal produced by the calculating mechanism.

It is also an object of this invention to provide in an automatic spindle speed control device an electric tachometer generator driven by the machine spindle and which produces the comparison signal for the speed setting of the aforementioned second servo mechanism.

Further features and advantages of this invention will appear from a detailed description of the drawings in which:

Figure 1 is a front perspective view of a milling machine to which this invention is particularly well adapted to regulate the cutter spindle speed.

Figure 2 shows a diagram of an exemplary spindle drive transmission and control members for the milling machine shown in Figure 1.

Figure 3 is a wiring diagram of the spindle speed control circuit.

For exemplary purposes, this invention is shown applied to a machine tool of the conventional knee and saddle type milling machine having a base 10 and column 11 on top of which is mounted the overarm 12 carrying the arbor support 13 which supports the outer end of the cutter arbor 14 carrying the milling cutter 15, the rear portion of the arbor 14 being appropriately clamped to the spindle nose 16 of the spindle 17. The milling machine has the usual knee 18, saddle 19, and table 20 for effecting the relative movement of work mounted on the top 21 of the table with respect to the cutter 15.

*Spindle drive transmission*

The spindle is driven from the main drive motor 22, Figure 5, which has a shaft 23 upon which is mounted a V-belt pulley having a fixed half-sheave 24 and a movable sheave 25 between which operates the belt 26 which in turn is connected to drive the V-belt pulley 27 which has an integral pulley 28, both of which are mounted on a suitable idler shaft 29 in any conventional manner. The pulley 28 has a belt 30 operating over it which in turn drives an adjustable V-belt pulley having the half-sheave 31 fixed to the shaft 32 and the adjustable half-sheave 33 cooperating with the sheave 31. A suitable adjusting device, such as the lever arm 34 carried on a pivot pin 35, has the respective arms 36 containing the roller 37 engaging the movable half-sheave 25 and the arm portion 38 containing the roller 39 engaging the half-sheave member 33. The lever arm 34 may be rocked to simultaneously adjust the members 25 and 33 by appropriately energizing the control motor 40 which has a screw 41 operating in a nut 42 which is connected by a suitable socket joint at 43 with the lever member 34 so as to effect an infinitely variable speed adjustment between the shaft 23 and the shaft 32.

Also mounted on the shaft 23 is a suitable magnetic brake 44 which is automatically energized when the main drive motor 22 is de-energized to clamp its brake band 45 on the brake drum 46 fixed to the shaft 23 to effect instant stopping of the main drive motor and drive power to the cutter spindle 16. Also on the shaft 23 is a spiral gear 47 from which power take-off may be had to drive a lubricating pump 48 and the coolant pump 49 ordinarily used with such type machine tools as shown in Figure 1.

On the shaft 32 is formed a bevel pinion 50 which drives a bevel gear 51 fixed on the back gear shaft 52 upon which is also mounted the high speed gear 53 and the low speed back gear 54. The gear 53 engages a gear 55 journaled on the cutter spindle 17 while the gear 54 engages the large gear 56 journaled on the spindle 17. A clutch spool 58 slidingly mounted in driving relationship on the spindle 17 has a friction clutch portion 59 which, when engaged, connects power from the gear 55 to drive the cutter spindle 17 at a high speed. The clutch spool also has a positive jaw clutch portion 60 cooperating with the gear 56 so that when this positive jaw clutch portion is engaged the gear 56 will then effect the low speed powerful drive to the cutter spindle 17.

The clutch spool member 57 may be actuated to engage either the friction clutch portion 59 or the positive jaw clutch portion 60 to effect a high or low speed drive to the spindle 17 by means of the control motor 61 which drives a screw 62 through an overload clutch 63 to operate a nut 64 which, through a ball and socket joint 65 rocks the lever 66 carried on the pivot pin 67 and having its other end engaging in the slot 68 formed in the clutch spool member 58. Thus, by appropriately energizing the motor 61, the high speed drive through the gears 53 and 55 may be applied to the cuter spindle 17 or by regulating the motor 61 the clutch spool may be shifted to engage the positive jaw portion to effect the drive from the gear 54 to the gear 56 to the cutter spindle 17. Also connected to be driven by the cutter spindle 17 is the tachometer generator 69 which develops an alternating current voltage that is proportional to the speed of the spindle 17.

Electric operating and control mechanism

Referring particularly to the wiring diagram, Figure 3, when current is applied to the leads L1, L2, and L3, the spindle drive motor 22 may be energized by depressing the spindle start button 71 which energizes the coil DMS and closes power contact DMSa to apply line voltage to the spindle drive motor. A suitable reversing switch 72 may be utilized for obtaining either desired direction of rotation of the cutter spindle. The spindle stop button 73 which de-energizes the coil DMS, opening power contacts DMSa, disconnecting line voltage from the spindle drive motor 22. Energizing of the DMS coil also closes the holding contact DMSa so that after the start button 71 is released, the coil DMS remains energized to continue the power flow through the closed power contacts DMSa to the spindle drive motor.

In the present arrangement, applicant automatically controls the speed of the cutter spindle 17 from the constant speed main drive motor 22 by automatically regulating and adjusting the variable V-belt transmission control motor 40 and the clutch shifting motor 61 in response to the rate of rotation of the cutter spindle 17. Applicant's apparatus also contemplates the setting of the correct spindle speed, taking in consideration all of the various elements for each particular machining operation.

More particularly, this automatic control system is intended to provide the proper cutter spindle speed for the milling machine. This device calculates the correct spindle speed for a given set of operating conditions and controls the operation of the spindle speed adjusting mechanism to establish the calculated spindle speed for any practical combination of operating conditions. This operation is accomplished automatically after the operator sets the desired operating conditions into the mechanism.

The device consists of (1) a calculating mechanism into which absolute values of the operating parameters are set and which is driven by an automatic servo mechanism that solves the speed formula and develops a signal voltage that is proportional to the calculated speed; (2) a second servo mechanism that automatically adjusts the spindle speed in response to the signal produced by the calculating mechanism; (3) an electric tachometer generator, driven by the milling machine spindle and which produces the comparison signal for the speed setting servo (2).

Speed formula

The cutter spindle speed indicated by the calculating mechanism is based upon a practical solution of the following empirical formula:

$$S = \frac{C \times F \times K}{d \times B^{1.8}} \qquad (1)$$

Where $S$ = Cutter spindle speed in R. P. M.
$C$ = Cutter factor, an empirical number
$F$ = Finish factor, an empirical number
$d$ = Cutter diameter in inches
$B$ = Brinell hardness of the work
$K$ = Empirical constant

Calculating mechanism

The calculating mechanism solves the above formula (Equation 1) and transmits a signal voltage proportional to the calculated speed to the spindle speed control servo.

The calculating mechanism consists of four groups of adjustable resistors arranged in a Wheatstone's bridge circuit. The mathematical relation of the resistance values required to establish balance in such a circuit is of the same general form as the speed formula Equation 1. This similarity provides the basis for the operation of the calculating device.

Referring to the schematic wiring diagram, the Wheatstone's bridge circuit shown is in balance when the resistance values in the four legs bear the following relation:

$$P2 = \frac{R-6 \times P-1}{P-4}$$

If the resistance of the leg R—6 is set proportional to C times F, the resistance of P—4 set proportional to $d$ and the resistance of P—1 set proportional to the reciprocal of $B^{1.8}$ and the resistance of leg P—2 is set proportional to S when the bridge is balanced the following relation will hold:

$$S = \frac{(C \times F) \times \frac{1}{B^{1.8}} \times K}{d}$$

This can be resolved into:

$$S = \frac{C \times F \times K}{d \times B^{1.8}}$$

which is the speed Formula 1.

The resistors P—1, P—2, and P—4 are continuously variable wire wound rheostats equipped with appropriately calibrated dials 74, 75, and 76 which enable the operator to set the proportional resistor value by setting the absolute value of the parameter on the dial.

The dial 74 associated with the rheostat P—1 is graduated in values proportional to Brinell hardness; the dial 75 associated with the rheostat P—2 is graduated in spindle speeds for the cutter spindle 17; and the dial 76 associated with the rheostat P—4 is graduated for cutter diameters placed on the arbor 14 or spindle nose 16.

The combination of C times F into one resistance presents no difficulty because there are only four fixed values of C and three fixed values of F in the given range of absolute values of parameters and therefore by means of the four fixed resistance taps R—6a and the three switching arrangements R—6b shown on the schematic diagram the twelve desired values of the product C times F can be set.

If desired, a continuously variable rheostat could be substituted for this group of fixed resistors. This rheostat would be provided with a dial having four bands or zones corresponding to the four types of cutters and representing the empirical constant C. In each of the four bands there would be three marked points that would correspond to the three fixed values of F. The rheostat might best be of the tapered type to provide linearity of scale. This arrangement would have an additional advantage in that the operator would be able to select a finish factor that more nearly suited the needs of the job since the rheostat would provide additional adjustment between the fixed values.

The rheostat P—1 is provided with a dial calibrated in such a manner that setting values of B indicated on the dial actually introduce a value of resistance proportional to $$\frac{1}{B^{1.8}}$$

in the circuit.

The rheostat P—2 is provided with a tandem mounting and the rheostat P—3 is mechanically connected to it. The rheostat P—3 is connected in a potentiometer circuit such that the output voltage is proportional to the arm position and since the arm position corresponds to that of the speed setting rheostat P—2, the output voltage from P—3 constitutes a signal voltage proportional to speed.

The tandem rheostats P—2 and P—3 are arranged to be driven by a split field universal motor 77. This motor is controlled by a polarized relay PR, the operating coil of which is connected across the null points of the Wheatstone's bridge circuit. This polarized relay therefore senses any unbalance in the bridge circuit and causes the motor 77 to drive the P—2 rheostat in the proper direction to balance the bridge and stops when balance is attained. The polarized relay and the motor therefore constitutes a simple servo system for controlling the balance of the bridge.

Certain combinations of the parameters when inserted into the speed formula give answers that are out of the range of speed of the machine. This condition is not unusual in a calculating device of this kind because it is necessary to carry all parameters over a reasonable range. The calculating device, however, will handle such problems without difficulty by running to one limit of speed or the other and then stopping, thus setting the speed as near as possible to that required.

The motor driven rheostats P—2 and P—3 are also provided with a calibrated dial 75 as previously mentioned. This provides two desirable features. First, the dial setting shows the operator the speed which is being set by the calculating device. Second, the drive between the balancing motor and this rheostat is to be provided with a slipping clutch or a garter spring belt of conventional design (not shown) that will slip when the dial is manipulated by hand and by this means the operator can manually adjust the mechanism to provide any desired speed within the range of the machine. A "Manual-Automatic" selector or switch 78 is provided to enable the operator to select the desired method of spindle speed setting.

Tachometer generator

The permanent magnet type alternating current tachometer generator 69 driven by the spindle 17 develops an alternating current voltage that is proportional to the spindle speed. This voltage is rectified to direct current by a full wave dry type rectifier 79 and the ripple eliminated by the filter circuit having the inductor 80 and condenser 81. This output voltage is compared with the output voltage of the P—3 potentiometer circuit and any difference produces the signal for operating the spindle speed adjusting servo.

Spindle speed adjusting mechanism

The control motors 40 and 61 are controlled automatically in response to data supplied by the electrical calculating device.

When the back gear positive jaw clutch 60 is engaged, the spindle speed is adjustable from 20 R. P. M. to 187 R. P. M. while with high speed friction clutch 59 engaged, the spindle speed is adjustable from 165 R. P. M. to 1000 R. P. M. The control mechanism that automatically adjusts the spindle speed in response to the speed signal voltage from the rheostat P—3 must therefore control both the clutch motor 61 and the pulley pitch ratio adjusting motor 40.

The back gear clutch motor 61 is controlled by a cam operated switch 82, a suitable cam (not shown) being rotated by the shaft 83 that drives the tandem rheostats P—2 and P—3, and is designed to throw the switch into the position that will engage the back gear when the desired speed is less than 187 R. P. M. When the rheostats are being driven in a direction to increase speed, the switch is operated as the rheostat passes through the position corresponding to 187 R. P. M. and the clutch operating motor starts by energizing coil CMF upon closing of contact 82a to cause power contacts CMFa to energize motor 61. This disengages the back gear and engages direct drive and speeds up to the maximum of 1000 R. P. M. are then available. The cam operated switch is arranged so that it will operate to again engage the back gear when the rheostats pass through a position corresponding to 165 R. P. M. in the decreasing direction by closing contact 82b to energize coil CMR to close power contacts CMRa for reverse energizing of motor 61. This overlap of speed in the two ranges is intended to prevent an unstable condition that might arise if a single transfer point were used and this critical transfer speed was desired. Limit switches 64a and 64b are actuated by the nut 64 at each end of its travel to de-energize coil CMF or CMR to stop further operation of the motor 61.

Speed control servo

The pulley ratio adjusting mechanism that provides spindle speed adjustment is driven by the two phase motor 40 whose speed and direction of rotation are controlled by a pair of saturable reactors. Two phase power for this motor is obtained by the use of a phase shifting capacitor 84. The motor is energized from the secondary of a center tapped transformer 85. This transformer provides two sources of power 180° out of phase therefore the motor can be made to run in either direction. One phase winding of the motor is permanently connected to the source of power through a condenser. This provides this phase winding with power approximately 90° out of phase with the line voltage. The second phase winding of the motor is connected to the two sources mentioned above (180° out of phase) through the saturable reactors RF and RR.

The saturable reactor is a variable iron core inductance which has two windings. The main or power winding RFa or RRa has high impedance under normal conditions when the reactor is unsaturated. When the auxiliary or control winding RFb or RRb is energized with direct current it causes the core of the reactor to become saturated and this causes the impedance of the main winding to decrease. This provides a means of controlling the impedance of the device by controlling the amount of direct current flowing in the control winding.

In the speed control servo these reactors are of sufficiently high impedance when no D. C. is present to prevent the motor from operating. Their control windings are connected so as to be energized by the voltage difference between the tachometer generator voltage and the output signal voltage from the calculating circuit. The control windings each have a half wave valve type rectifier 85 connected in series with the winding. By this arrangement the proper saturable reactor control winding is energized to cause the motor to run in the correct direction to equalize the compared signal voltages. When the tachometer voltage and the speed signal voltage are equal no current will flow through the reactor control windings and the motor will be at rest. If the tachometer voltage is greater than the speed signal voltage, current will flow through one reactor control winding. The valve type rectifier 85 will prevent current from flowing through the other reactor control winding. This will reduce the impedance of the one reactor while the other will not be affected and power of the proper phase will be applied to the motor causing it to run in the proper direction to change the pulley ratio in the proper manner to reduce spindle speed. As the tachometer voltage and the speed signal voltage become equal, the amount of current flowing in the reactor control winding will decrease and the motor speed will be decreased and the motor will stop when the compared voltages are equal. The operation is comparable when the speed signal voltage is higher than the tachometer voltage except that the other reactor will be affected and the motor will operate in a reverse direction.

In order to eliminate errors and false operation that might be caused by line voltage fluctuation or variations, a constant voltage direct current power supply is provided for the calculating circuit. This consists of a commercial type constant voltage transformer 86 which furnishes power to a full wave bridge type rectifier 87. The output of the rectifier is filtered to remove the objectionable ripple by the capacitor 88 and condenser 89.

A variable resistor 90 may be utilized to vary the sensitivity of the Wheatstone bridge control circuit. The resistor 91 is utilized for adjusting the circuit for the minimum revolutions per minute of spindle speed adjustment.

A variable resistor 92 is utilized for making adjustments in the maximum Brinell adjusting resistor P—1 and its control dial 74. A variable resistor 93 is used for adjusting the cutter diameter rheostat P—4 and its dial 76. And the resistor 94 is used for making adjustments relative to the resistance R—6. A resistor 95 is for adjusting the minimum output voltage.

There has thus been provided an automatic spindle speed control mechanism for regulating the proper spindle speed of a machine tool to meet any combination of operating conditions and which apparatus also automatically maintains a predetermined spindle speed selected for the conditions set up for the control apparatus.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a spindle speed control for a machine tool having a constant speed main drive motor, a variable speed transmission driven by said motor, a work spindle connected to be driven from said variable speed transmission, and means for adjusting said variable speed transmission including an electric motor mechanically connected to adjust said variable speed transmission, a source of power for said adjusting motor, a saturable reactor electrically connected to control said adjusting motor, a tachometer generator mechanically driven from said work spindle electrically connected to apply a generated voltage to said saturable reactor, and a second source of manually adjustable voltage connected to said saturable reactor in opposed relationship to said generated voltage so that variations in spindle speed causes variations in the rate of the output voltage of said generator relative to said opposing voltage to vary the impedance in said saturable reactor to automatically operate said adjusting motor for the variable speed transmission so that both of said voltages compensate each other to maintain a predetermined speed of rotation for said spindle depending upon the manual setting of said second voltage.

2. In a spindle speed control mechanism for a machine tool having a constant speed main drive motor, a variable speed transmission driven from said motor, a back gear change speed transmission driven from said variable speed transmission, a spindle driven from said back gear transmission, an adjusting motor mechanically connected to vary the rate of output of said variable speed transmission, a source of power for said adjusting motor, a saturable reactor electrically connected to control said adjusting motor for the variable speed transmission, a tachometer generator mechanically driven from said spindle and electrically connected to said saturable reactor to control the direction and stopping and starting of said adjusting motor for the variable speed transmission in accordance with variations in the speed of said spindle, an adjusting motor for controlling said back gear change speed transmission, and common electric control means including said tachometer generator for simultaneously regulating said saturable reactor and said back gear adjusting motor in a predetermined sequential relationship to effect a complete range of selectable speeds for said spindle.

3. In a spindle speed control mechanism for a machine tool having a constant speed main drive motor, a variable speed transmission driven from said motor, a back gear change speed transmission driven from said variable speed transmission, a spindle driven from said back gear transmission, an adjusting motor mechanically connected to vary the rate of output of said variable speed transmission, a source of power for said adjusting motor, a saturable reactor electrically connected to control said adjusting motor for the variable speed transmission, a tachometer generator mechanically driven from said spindle and electrically connected to said saturable reactor to control the direction and stopping and starting of said adjusting motor for the variable speed transmission in accordance with variations in the speed of said spindle, an adjusting motor for shifting said back gear transmission, common electric control means for simultaneously regulating said saturable reactor and said back gear adjusting motor including means wherein the electrical summation of the tachometer generator and the common electrical control means exerts the controlling influence on said reactor in a predetermined sequential relationship to effect a complete range of selectable speeds for said spindle, and further electrical control means adjustable to the nature of the work operation to be undertaken for regulating said last mentioned control means to automatically condition the spindle speed of said machine to meet a predetermined series of operating conditions.

4. In a spindle speed control mechanism for a machine tool having a constant speed main drive motor, a variable speed transmission driven from said motor, a back gear change speed transmission driven from said variable speed transmission, a spindle driven from said back gear transmission, an adjusting motor mechanically connected to vary the rate of output of said variable speed transmission, a source of power for said adjusting motor, a saturable reactor electrically connected control to said adjusting motor for the variable speed transmission, a tachometer generator mechanically driven from said spindle and electrically connected to said saturable reactor to control the direction and stopping and starting of said adjusting motor for the variable speed transmission in accordance with variations in the speed of said spindle, an adjusting motor for shifting said back gear change transmission, common electric control means for simultaneously regulating said saturable reactor and said back gear adjusting motor including means wherein the electrical summation of the tachometer generator and the common electrical control means exerts the controlling influence on said reactor in a predetermined sequential relationship to effect a complete range of selectable speeds for said spindle, and further electrical control means adjustable to the nature of the work operation to be undertaken for regulating said last mentioned control means to automatically condition the spindle speed of said machine to meet a predetermined series of operating conditions, said last mentioned means including a Wheatstone bridge having four variable resistance legs each of said legs being adjustable with regard to the cutter diameter, Brinell hardness of the work, type of cutter and finish desired, and spindle speed, respectively, of a particular work operation to be undertaken, a summation of said adjustable resistances of the legs of said Wheatstone bridge being actuable to control said saturable reactor in conjunction with said tachometer generator and said adjusting motor for the back gear change speed transmission so as to automatically set the work spindle to the desired speed for the various operating conditions of the particular machining operation set up.

5. In a spindle speed control mechanism for a machine tool having a constant speed main drive motor, a variable speed transmission driven from said motor, and a spindle driven from said variable speed transmission, electrical operating means for adjusting said variable speed transmission, means for controlling said electrical operating means in response to a series of operating conditions comprising an electrical setting and regulating device including a Wheatstone bridge having four variable resistance legs, one of said legs having a variable resistor adjustable for cutter diameter, a second leg adjustable for Brinell hardness of the work, a third resistance leg adjustable for type of cutter and finish desired, and a fourth adjustable resistance leg for the desired spindle speed to be maintained, a power adjusting means for said fourth mentioned variable resistance leg including a polarized relay responsive to the unbalance of said Wheatstone bridge and electrical control means interconnected between said fourth mentioned variable resistance leg and the adjusting means for said variable speed transmission.

6. In a spindle speed control mechanism for a machine tool having a constant speed main drive motor, a variable speed transmission driven from said motor, and a spindle driven from said variable speed transmission, electrical operating means for adjusting said variable speed transmission, means for controlling said electrical operating means in response to a series of operating conditions comprising an electrical setting and regulating device including a Wheatstone bridge having four variable resistance legs, one of said legs having a variable resistor adjustable for cutter diameter, a second leg adjustable for Brinell hardness of the work, a third resistance leg adjustable for type of cutter and finish desired, and a fourth adjustable resistance leg for the desired spindle speed to be maintained, a power adjusting means for said fourth mentioned variable resistance leg including a polarized relay responsive to the unbalance of said Wheatstone bridge and electrical control means interconnected between said fourth mentioned variable resistance leg and the adjusting means for said variable speed transmission, a speed responsive electrical device driven from said spindle and electrically connected to said second mentioned electrical control means for automatically maintaining the speed of said spindle at a predetermined position of adjustment as effected by said Wheatstone bridge electrical apparatus.

7. In an automatic spindle speed control mechanism for a machine tool having a constant speed main drive motor, a variable speed transmission driven by said motor, a back gear change speed transmission driven from said variable speed transmission, a spindle driven from said back gear transmission, an adjusting motor mechanically connected to vary the rate of output of said variable speed transmission, a source of power for said adjusting motor, a back gear adjusting motor connected to change said back gear change speed transmission, and electrical control means for both of said adjusting motors comprising a Wheatstone bridge electrical circuit having a cutter diameter variable resistor in one leg, a Brinell selecting variable resistor in a second leg, a cutter type and finish desired variable resistor in a third leg, and a spindle speed variable resistor selector in the fourth leg, a saturable reactor connected to control the adjusting motor for said variable speed transmission, a variable resistor simultaneously movable with said resistor in the fourth leg of said Wheatstone bridge electrically connected to said saturable reactor to change its impedance, and switch means also simultaneously operated by said fourth mentioned resistor in said Wheatstone bridge for operating the adjusting motor for the back gear change speed transmission.

8. In an automatic spindle speed control mechanism for a machine tool having a constant speed main drive motor, a variable speed transmission driven by said motor, a back gear change speed transmission driven from said variable speed transmission, a spindle driven from said back gear transmission, an adjusting motor mechanically connected to vary the rate of output of said variable speed transmission, a source of power for said adjusting motor, a back gear adjusting motor connected to change said back gear change speed transmission, and electrical control means for both of said adjusting motors comprising a Wheatstone bridge electrical circuit having a cutter diameter variable resistor in one leg, a Brinell selecting variable resistor in a second leg, a cutter type and finish desired variable resistor in a third leg, and a spindle speed variable resistor selector in the fourth leg, a saturable reactor connected to control the adjusting motor for said variable speed transmission, a variable resistor simultaneously movable with said resistor in the fourth leg of said Wheatstone bridge electrically connected to said saturable reactor to change its impedance, switch means also simultaneously operated by said fourth mentioned resistor in said Wheatstone bridge for operating the adjusting motor for the back gear change speed transmission, and power means for automatically adjusting said fourth mentioned variable resistor, the resistor for the saturable reactor, and the switches for said back gear adjusting motor in response to the unbalance of current flow in said Wheatstone bridge circuit.

9. In an automatic spindle speed control mechanism for a machine tool having a constant speed main drive motor, a variable speed transmission driven by said motor, a back gear change speed transmission driven from said variable speed transmission, a spindle driven from said back gear transmission, an adjusting motor mechanically connected to vary the rate of output of said variable speed transmission, a source of power for said adjusting motor, a back gear adjusting motor connected to change said back gear change speed transmission, and electrical control means for both of said adjusting motors comprising a Wheatstone bridge electrical circuit having a cutter diameter variable resistor in one leg, a Brinell selecting variable resistor in a second leg, a cutter type and finish desired variable resistor in a third leg, and a spindle speed variable resistance selector in the fourth leg, a saturable reactor connected to control the adjusting motor for said variable speed transmission, a variable resistor simultaneously movable with said resistor in the fourth leg of said Wheatstone bridge electrically connected to said saturable reactor to change its impedance, switch means also simultaneously operated by said fourth mentioned resistor in said Wheatstone bridge for operating the adjusting motor for the back gear change speed transmission, and power means for automatically adjusting said fourth mentioned variable resistor, the resistor for the saturable reactor, and the switches for said back gear adjusting motor in response to the unbalance of current flow in said Wheatstone bridge circuit, said adjusting means comprising a polarized relay connected across the null points of the Wheatstone bridge circuit, and an adjusting motor for said fourth mentioned variable resistor of said bridge electrically controlled by said polarized relay for operation in either direction or stopping.

10. In an automatic spindle speed control mechanism for a machine tool having a constant speed main drive motor, a variable speed transmission driven by said motor, a back gear change speed transmission driven from said variable speed transmission, a spindle driven from said back gear transmission, an adjusting motor mechanically connected to vary the rate of output of said variable speed transmission, a source of power for said adjusting motor, a back gear adjusting motor connected to change said back gear change speed transmission, and electrical control means for both of said adjusting motors comprising a Wheatstone bridge electrical circuit having a cutter diameter variable resistor in one leg, a Brinell selecting variable resistor in a second leg, a cutter type and finish desired variable resistor in a third leg, and a spindle speed variable resistance selector in the fourth leg, a saturable reactor connected to control the adjusting motor for said variable speed transmission, a variable resistor simultaneously movable with said resistor in the fourth leg of said Wheatstone bridge electrically connected to said saturable reactor to change its impedance, switch means also simultaneously operated by said fourth mentioned resistor in said Wheatstone bridge for operating the adjusting motor for the back gear change speed transmission, and power means for automatically adjusting said fourth mentioned variable resistor, the resistor for the saturable reactor, and the switches for said back gear adjusting motor in response to the unbalance of current flow in said Wheatstone bridge circuit, a tachometer generator driven from said spindle and electrically connected to said saturable reactor including means wherein the electrical summation of the tachometer generator and the Wheatstone bridge circuit exerts the controlling influence on said reactor to regulate the operation of the adjusting motor for said variable speed transmission in response to variations in the speed of said spindle.

11. In a spindle control mechanism for a machine tool having a variable speed source of driving power, and a spindle driven from said source of power, electrical operating means for varying the rate of speed of said source of power, means for controlling said electrical operating means in response to a series of operating conditions comprising an electrical setting and regulating device including a Wheatstone bridge having four variable resistance legs, one of said legs having a variable resistor adjustable for cutter diameter, a second leg adjustable for Brinell hardness of the work, a third resistance leg for type of cutter and finish desired, and a fourth adjustable resistance leg for the desired spindle speed to be maintained, a power adjusting means for said fourth mentioned variable resistance leg including a polarized relay responsive to the unbalance of said Wheatstone bridge and further electric control means interconnected between said fourth mentioned variable resistance leg and the adjusting means for said source of power.

OREN G. RUTEMILLER.

REFERENCES CITED

The following references are of record in the file of this patent:

UNITED STATES PATENTS

| Number | Name | Date |
|---|---|---|
| 1,836,992 | Schade et al. | Dec. 15, 1931 |
| 2,113,164 | Williams | Apr. 5, 1938 |
| 2,116,593 | Bovier | May 10, 1938 |
| 2,269,434 | Brooks | Jan. 13, 1942 |
| 2,271,598 | Maurer | Feb. 3, 1942 |
| 2,299,911 | Logan | Oct. 27, 1942 |
| 2,419,120 | Clarke | Apr. 15, 1947 |